United States Patent [19]

Yamada

[11] 4,402,015
[45] Aug. 30, 1983

[54] PICTURE SIGNAL PRE-PROCESSING METHOD FOR A PICTURE REPRODUCING MACHINE

[75] Inventor: Mitsuhiko Yamada, Kyoto, Japan

[73] Assignee: Dainippon Screen Seizo Kabushiki Kaisha, Kyoto, Japan

[21] Appl. No.: 223,910

[22] Filed: Jan. 9, 1981

[30] Foreign Application Priority Data

Jan. 21, 1980 [JP] Japan ................................. 55-5587

[51] Int. Cl.³ ............................................. H04N 1/40
[52] U.S. Cl. ..................................... 358/280; 358/80; 358/284
[58] Field of Search ................... 358/76, 80, 280, 284; 364/515

[56] References Cited

U.S. PATENT DOCUMENTS

3,729,584  4/1973  de Vos ................................ 358/280
4,058,828 11/1977  Ladd .................................... 358/80
4,250,522  2/1981  Seki ..................................... 358/76
4,305,093 12/1981  Nasu .................................... 358/80
4,307,415 12/1981  Sundermeyer ........................ 358/80
4,346,409  8/1982  Ishida ................................. 358/284

Primary Examiner—Howard Britton
Attorney, Agent, or Firm—Zarley, McKee, Thomte, Voorhees & Sease

[57] ABSTRACT

A method for pre-processing a picture signal prior to an operational circuit of a picture reproducing machine such as a color scanner and a color facsimile, wherein an original picture is scanned photoelectrically to obtain the picture signal, wherein first conversion characteristics data stored in a memory are read out by addressing addresses of the memory by the picture signal, and then are changed by second conversion characteristics data depending on a desired reproducible density range of the original picture.

6 Claims, 13 Drawing Figures

PICTURE SIGNAL PRE-PROCESSING METHOD FOR A PICTURE REPRODUCING MACHINE

BACKGROUND OF THE INVENTION

This invention relates to a method for pre-processing a picture signal prior to an operational circuit of a picture reproducing machine such as a color scanner and a color facsimile, and more particularly relates to a method for pre-processing a picture signal for converting a desired reproducible density range of an original picture into an operational density range of the operational circuit of the picture reproducing machine.

In a picture reproducing machine such as a color scanner for plate-making, in order to perform a processing of picture signals such as a masking operation, a color correction operation, and so forth in an operational circuit, usually the picture signals obtained by scanning an original picture photoelectrically are logarithmically converted.

The density range of the picture signals is determined in advance depending on a reproducing method of a reproduction picture. For example, when the original picture is reproduced by a halftone reproduction picture, the minimum and the maximum density values correspond to halftone dot area rates of 0% and 100%, respectively, which correspond to the minimum and the maximum values of the gradation scale required to the reproduction picture, and to a highlight point (the lightest point of the density range required to the reproduction picture) having a highlight density $D_H$ and a shadow point (the darkest point of the density range required to the reproduction picture) having a shadow density $D_S$, respectively.

Although in a usual plate-making the highlight and the shadow points correspond to the halftone dot area rates of 5% and 95%, however, they correspond to the halftone dot area rates of 0% and 100% in the following description.

The highlight density $D_H$ and the shadow density $D_S$ depend on the original pictures, and the difference between the highlight density $D_H$ and the shadow density $D_S$ or the density range depends on the original pictures.

In the picture reproducing machine, before the picture signals are sent to the operational circuit, usually the highlight density $D_H$ and the shadow density $D_S$ of the original picture are pre-processed so that the density range of the original picture may be in a certain voltage range of the operational circuit.

Such a pre-processing is important to the decision of the density range of the reproduction picture. The controls of the highlight and the shadow densities $D_H$ and $D_S$ of the reproduction picture to the halftone dot area rates of 0% and 100% are commonly referred to as a highlight setup and a shadow setup.

The highlight and the shadow setups also indicate the adjustment of the input conditions for the operational circuit, which are different per each original picture, prior to the start of the picture reproducing machine, and thus these setups are referred to as an input setup in the following description.

Figure 1:
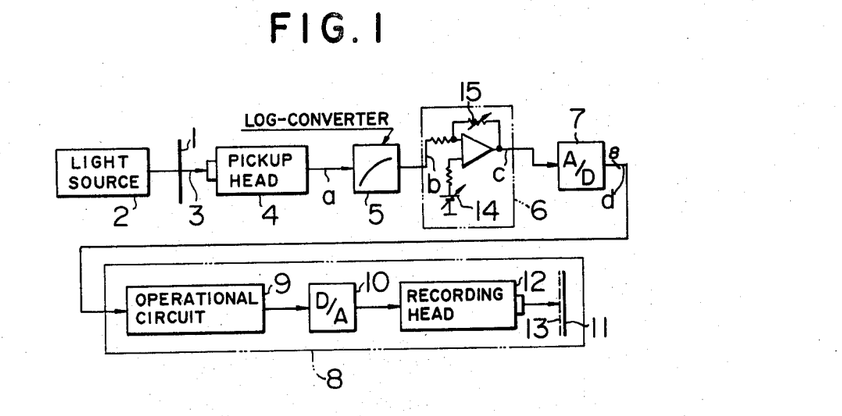
FIG. 1 is a block diagram of a digital color scanner including a conventional pre-processor means, wherein a signal is processed in a direction, as shown by arrows.
Figure 2:
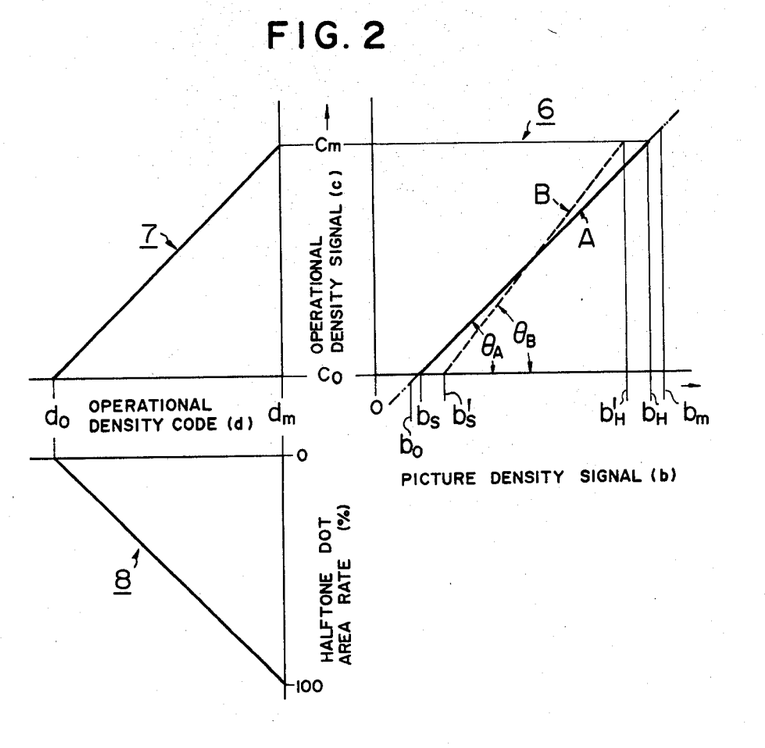
FIG. 2 is a graph for signal conversions performed in the color scanner shown in FIG. 1.

In FIG. 1 there is shown a digital color scanner including a conventional pre-processor means, wherein a signal is processed in a direction, as shown by arrows. In FIG. 2 there is shown a graph for signal conversions performed in the color scanner shown in FIG. 1.

An original picture 1 illuminated by a light source 2 is scanned photoelectrically by a scanning means (not shown). A light beam 3 through the original picture 1 is picked up by a pickup head 4 to obtain a picture signal a. Then, the picture signal a is sent to a log-converter 5 and is converted logarithmically there to output a picture density signal b which is then fed to a conventional input setup circuit 6.

The input setup circuit 6 adjusts the density range of the picture density signal b and outputs an operational density signal c so that shadow and highlight values $b_S$ and $b_H$ of the picture density signal b, which correspond to the shadow and the highlight densities $D_S$ and $D_H$ of the original picture, may correspond to minimum and maximum values $c_o$ and $c_m$ of the operational density signal c.

The operational density signal c can be fed directly to an operational circuit of an analog color scanner.

In this embodiment, the operational density signal c is input to an analog-digital converter 7, hereinafter referred to as A/D converter, and is converted into a digital operational density code d which is to be sent to an operational recorder 8.

The operational recorder 8 comprises an operational circuit 9 which carrys out a color correction, a masking, and other correction operations required to the color scanner, a digital-analog converter 10 which converts a digital signal into an analog signal, and a recording head 12 which records a reproduction picture onto a recording film 11 by scanning. A contact screen 13 is attached onto the front surface of the recording film 11, as occasion demands.

The adjustment of the input setup circuit 6 is carried out by allowing to coincide the density range of the operational density signal c with the input voltage range of the A/D converter 7 by the standard level adjustment and the span adjustment of the operational density signal c so that the shadow and the highlight values $b_S$ and $b_H$ of the picture density signal b may be coincident with the minimum and the maximum values $d_o$ and $d_m$ predetermined of the operational density code d which is output from the A/D converter 7, as follows.

For example, two different original pictures 1 and 1' to be reproduced have different shadow densities $D_S$ and $D_S'$ and different highlight densities $D_H$ and $D_H'$, and hence the shadow values $b_S$ and $b_S'$ and the highlight values $b_H$ and $b_H'$ of the picture density signals b are different.

In order to force the different shadow and highlight values $b_S$, $b_S'$, $b_H$ and $b_H'$ to correspond to the minimum and the maximum values $d_o$ and $d_m$ of the operational density code d, the conversion characteristics of the setup circuit 6 are adjusted, as shown by the characteristics curves A and B for the original pictures 1 and 1' in FIG. 2, so that the shadow values $b_S$ and $b_S'$ and the highlight values $b_H$ and $b_H'$ may be converted into the minimum and the maximum operational density signals $c_o$ and $c_m$.

In the setup circuit 6 the standard level adjustment and the span adjustment are carried out by means of a level shift circuit 14 and a gain control circuit 15, respectively. That is, the level shift circuit 14 shifts the level of the operational density signal c so that the shadow values $b_S$ and $b_S'$ of the signals b may correspond to the minimum value $c_o$ of the operational density signal c, and the gain control circuit 15 adjusts the inclinations $\theta_A$ and $\theta_B$ of the characteristics curves A and B, i.e. the conversion gains, so that the highlight values $b_H$ and $b_H'$ of the signals b may correspond to the maximum value $c_m$ of the operational density signal c, thereby setting the standard level and the span.

Meanwhile, since the picture signal a to be fed to the log-converter 5 requires a wide dynamic range such as a three decade range, i.e. a range of three figures of decimals or a density value of at least 3.0, a high stability against a direct-current drift, a gain drift, and so forth, is required to the log-converter 5. The same stability as the log-converter 5 is also required to the setup circuit 6.

Further, a good operability is also required to the setup circuit 6, for example, the adjustments can readily be performed according to the different input conditions of the different original pictures. In a conventional setup circuit 6, the operability and the stability are contrary to each other, that is, the one better, the other worse.

On the other hand, in general, each color separation picture signal of red, green or blue is processed in each color channel through a photoelectric converter, a pre-amplifier, a logarithmic converter, and so forth, and the deviations of the conversion characteristics or the transfer characteristics, and the linearities of the conversion characteristics are usually different per each color channel. Therefore, it is necessary to correct these values of the different original pictures in each color channel in order to be the same value so that these values corrected may directly be input to the operational circuit of the picture reproducing machine.

In order to remove the deviations of the relative characteristics among the color channels and to correct the linearities of the conversion characteristics in each color channel, for example, it is ideal to convert the picture density signal b into a certain function by using a straight line segment function converter. However, such a straight line segment function converter having a complicated construction is unstable. Further, it is difficult to adjust the straight line segment function converter.

SUMMARY OF THE INVENTION

Therefore, it is an object of the present invention to provide a method for pre-processing a picture signal prior to an operational circuit of a picture reproducing machine free from the abovementioned inconveniences, which has a high stability, a good operability, and a good convertibility.

According to the present invention there is provided a method for pre-processing a picture signal prior to an operational circuit of a picture reproducing machine wherein an original picture is scanned photoelectrically to obtain the picture signal, comprising the steps of (a) reading out first conversion characteristics data stored in a memory by addressing addresses of the memory by the picture signal, and (b) changing the first conversion characteristics data by second conversion characteristics data depending on a desired reproducible density range of the original picture.

BRIEF DESCRIPTION OF DRAWINGS

In order that the present invention may be better understood, preferred embodiments thereof will be described with reference to the accompanying drawings, in which.

DESCRIPTION OF PREFERRED EMBODIMENTS

Figure 3:
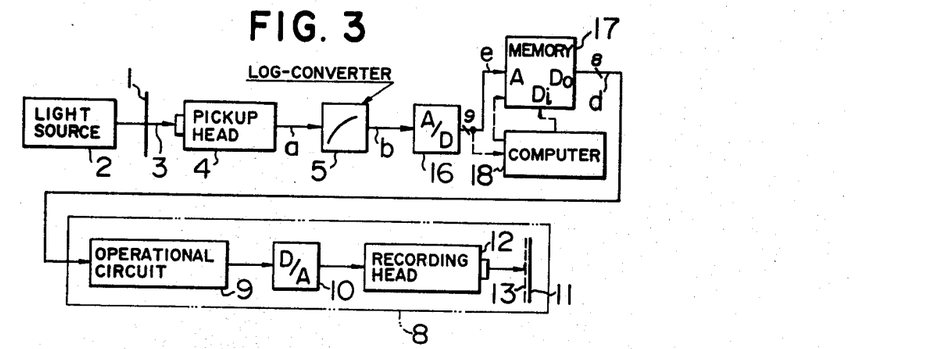
FIG. 3 is a block diagram of a digital color scanner including a pre-processor means according to the present invention, wherein a signal is processed in a direction, as shown by arrows.

There is shown in FIG. 3 a digital color scanner including a pre-processor means which performs a method according to the present invention, wherein a picture signal is processed in a direction, as shown by arrows. The members indicated by the same numbers of FIG. 3 as those in the conventional color scanner shown in FIG. 1 are the same as those of FIG. 1, and hence their explanations can be omitted. The color separation picture signal of each primary color of red, green or blue is processed per each color channel in the picture reproducing machine such as the color scanner. However, one of the color channels will be described with reference to FIG. 3.

In FIG. 3 the analog picture density signal b is directly fed to a A/D converter 16 and is converted there into a digital picture density code e.

When the operational density code d to be input to the operational recorder 8 is expressed by eight bits, the A/D converter 16 having a resolving power corresponding to its output signal of nine bits is used. However, as described hereinafter, no more than about the half of the input range of the A/D converter 16 is effectively utilized, and therefore its substantial resolving power is not different from that of eight bits.

The picture density code e of nine bits, which is output from the A/D converter 16, is sent to a following memory 17 and addresses its addresses. Then, the memory 17 outputs an operational density code d of eight bits corresponding to the picture density code e from the address pointed out.

The operational density code d read out of the memory 17, which is almost the same as that read out of the A/D converter 7 shown in FIGS. 1 and 2, is then sent to the operational recorder 8. The input range of the A/D converter 16 is sufficiently wider than the span or the amplitude of the picture density signal b, as described above, and the span of the picture density signal b is settled in the middle of the input range.

For example, when the light beam 3 is completely shut off, the minimum value $b_0$ corresponding to the offset level is obtained. This minimum value $b_0$ is set up somewhat higher than the zero level so that the minimum value $b_0$ may not be below the zero level of the A/D converter 16 when it is changed by the drifts, or the like.

Hence, the level of the picture density signal b is settled so that, no matter how the minimum value $b_0$ is changed, it may always be included in the input range of the A/D converter 16, and a minimum picture density code $e_0$ corresponding to the minimum value $b_0$ is utilized as a black level value.

When the strength of the light beam 3 is not decreased by the original picture at all, or the light generated from the light source 2 passes only through the carrier for the original picture 1, the maximum value $b_m$ of the picture density signal b can sufficiently come in the input range of the A/D converter settled as above, and a maximum picture density code $e_m$ corresponding to the maximum value $b_m$ is utilized as a white level value.

Between the black level value $e_0$ and the white level value $e_m$, the shadow and the highlight values $e_S$ and $e_H$ of the picture density code e, corresponding to the shadow and the highlight densities $D_S$ and $D_H$ for each original picture, exist. A table is prepared and stored in the memory 17 in advance, as shown in FIG. 4, so that minimum and maximum values $d_0$ and $d_m$ of the operational density code d may be read out of the memory 17 by addressing the addresses of the memory 17 by the shadow and the highlight values $e_S$ and $e_H$ of the picture density code e.

Figure 4:
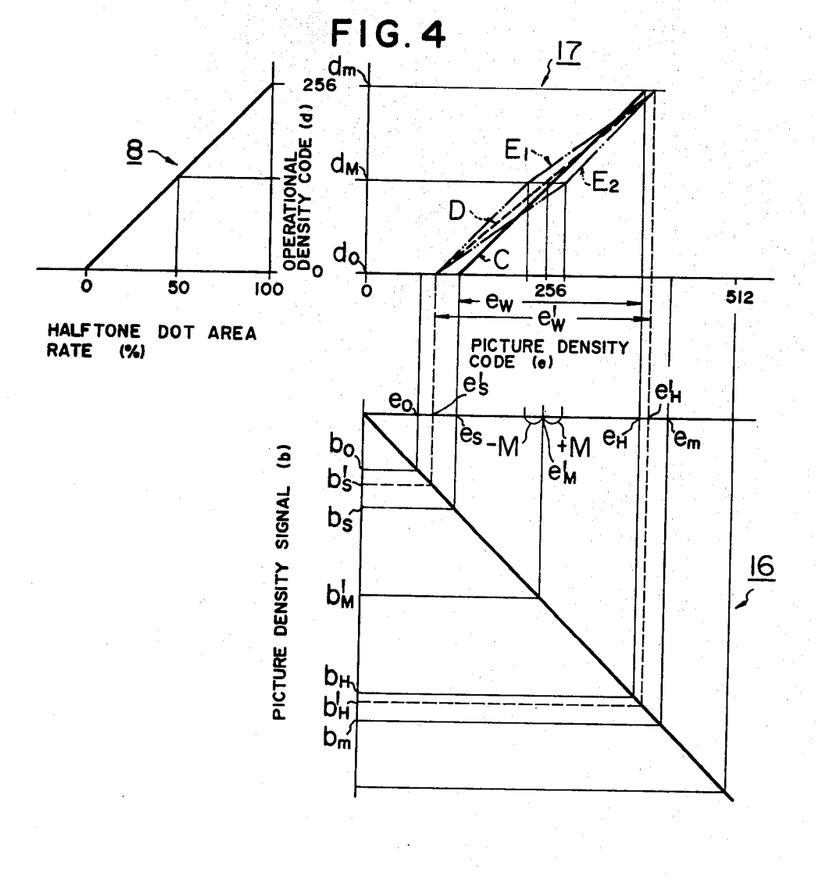
FIG. 4 is a graph for signal conversions performed in the color scanner shown in FIG. 3.

In FIG. 4 there are shown a characteristics line C of a solid line within the code span ($e_H - e_S = e_W$) of the picture density code e, corresponding to the span ($b_H - b_S$) of the picture density signal b, along the characteristics line C there being 256 picture density codes e, and a characteristics line D of a broken line within the wider code span ($e_H' - e_S' = e_W'$) of the picture density code e, corresponding to the wider span ($b_H' - b_S'$) of the picture density signal b, along the characteristics line D there being more than 256 picture density codes e. There are also shown in FIG. 4 two characteristics lines $E_1$ and $E_2$ of two-dotted lines within the same code span $e_W'$ as that of the line D, wherein in order to obtain the halftone dot area rate of 50% by using the line D, the control amount $+M$ or $-M$ is shifted from the middle value $e_M'$ of the picture density code e.

The shadow and the highlight values $e_S$ and $e_H$ corresponding to the shadow and the highlight density signals $b_S$ and $b_H$ of the original picture 1 are input to a competer 18 prior to the recording of the reproduction picture, and the memory 17 is controlled by the competer 18 so that the table stored in the memory 17 may be rewritten depending on the shadow and the highlight values $e_S$ and $e_H$.

Figure 5:
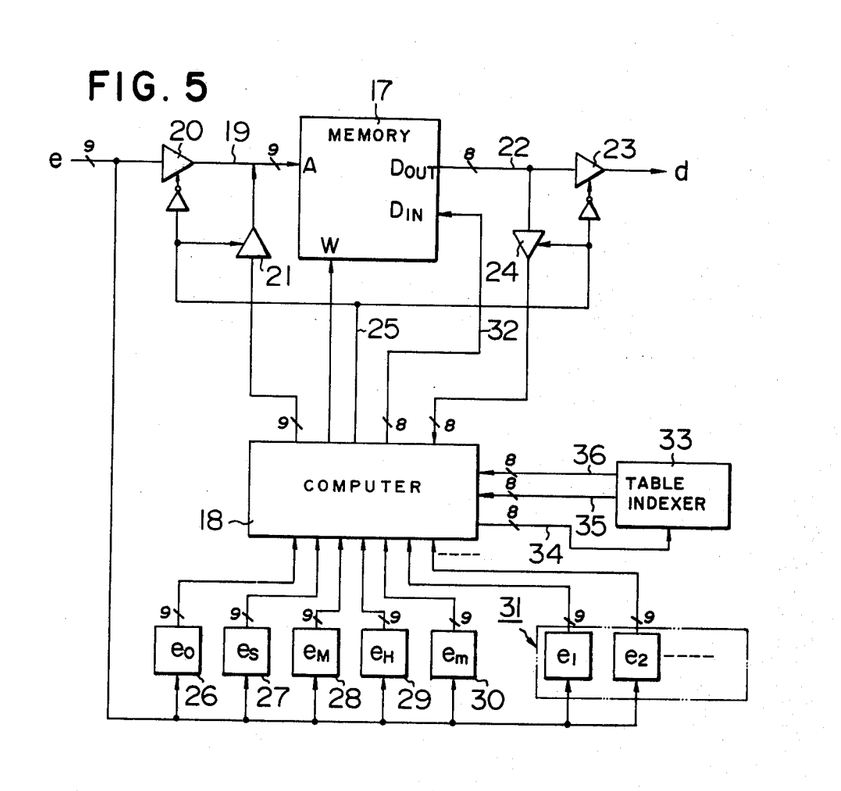
FIG. 5 shows a circuit including a memory and a computer connected thereto, shown in FIG. 3.

In FIG. 5 there is shown a circuit including the memory 17 and the competer 18 connected thereto. The picture density code e output from the A/D converter 16 is fed to the address busline 19 of the memory 17 via a bus buffer 20. The address signal is fed to the address busline 19 of the memory 71 via a bus buffer 21. The operational density code d is sent from the output busline 22 of the memory 17 to the operational recorder 8 via a bus buffer 23 and the computer 18 via a bus buffer 24.

When the memory 17 is used ordinary, the bus buffer 20 and 23 are opened. But, when the table is prepared in the memory 17 by using the computer 18, the bus buffers 21 and 24 are opened. The opening and the closing of the bus buffers 20, 21, 23 and 24 are carried out by an order signal 25 generated by the computer 18, which is sent to the bus buffers via a bus line.

The computer 18 is provided with registers 26-30 for recording the black level value $e_0$, the shadow, the middle, and the highlight values $e_S$, $e_M$ and $e_H$ for the original picture 1, and the white level code $e_m$. The computer 18 is also provided with a group of registers 31 for recording conversion values $e_1, e_2, \ldots$ in order to convert the picture density signals b into the picture density codes e for the linearity correction, a gray scale and a color patch for adjusting, other control patchs, and so forth. The computer prepares the desired table in the memory 17 according to the values recorded in the registers 26-31.

For example, when the original picture has a shadow density $D_S'$ and a highlight density $D_H'$, the corresponding shadow and highlight values $e_S'$ and $e_H'$ are recorded in the registers 27 and 29. Then, the memory 17 and the computer 18 are connected each other via the bus buffers 21 and 24, and the computer 18 consecutively sends the address signals corresponding to the addresses between $e_S'$ and $e_H'$, and also sends the desired data which are to be written in the addresses addressed by the address signals, to a writing input busline 32 of the memory 17 in the same time.

Since the minimum and the maximum addresses $e_S'$ and $e_H'$ of the address range to be obtained correspond to the minimum and the maximum data $d_0$ and $d_m$, when the codes e are in linear proportion to the codes d, the data calculation for each address of the address signal can readily by carried out according to a straight line passing through the minimum and the maximum values. The line D shown by the broken line in FIG. 4 represents the characteristics obtained, as described above.

The address number $e_W'$, which is the same as the address span and thus is hereinafter referred to as the address span, of the address range is the difference $e_H' - e_S'$ between the last address $e_H'$ and the first address $e_S'$, and further, since the first and the last data values $d_0$ and $d_m$ corresponding to the first and the last addresses $e_S'$ and $e_H'$ are known, the desired characteristics except the linear ones described above can also be obtained by the calculation.

Further, if an address and its known data are appointed in the intermediate portion of the address span $e_W'$, a characteristics line of a straight line segment graph can readily be obtained.

For example, in FIG. 4 the middle value $e_M'$ can be shifted somewhat forward or rearward from the value corresponding to the halftone dot area rate of 50%, or the value corresponding to the halftone dot area rate of 50% can be shifted forward or rearward to the control amount M from the middle value $e_M'$, as shown by the characteristics lines $E_1$ and $E_2$ in FIG. 4.

In this case, the operational density code d corresponding to the halftone dot area rate of 50% is known, and thus the middle value $e_M'$ can be obtained by the following formula.

$$e'_M = e_S + \frac{e'_H - e'_S}{2}$$

The control amount M is predetermined in advance. Alternatively, the middle value $e_M'$ is not calculated by using the above formula, but a density $D_M'$ to be reproduced to the halftone dot area rate of 50% may be recorded in the register 28 as the middle value $e_M'$ of the picture density code e in advance, and be utilized in the calculation.

On the other hand, the computer 18 can also index the desired table to be stored in the memory 17 instead of the calculation described above as follows. For example, a plurality of tables which are prepared previously depending on the deviation correction characteristics and the address spans desired, are stored in a table indexer 33 together with their index numbers, and then the computer 18 sends an index signal 34 to the table indexer 33 via a busline in order to select the desired table. Then, the address signals 35 and the data signals 36 of the table selected are consecutively fed to the computer 18 via buslines, and the computer 18 replaces the table stored in the memory 17 with the new table fed from the table indexer 33.

In this embodiment, if all the tables desired are stored in the table indexer 33 and one of them is selected from the table indexer 33 by indexing, the table indexer 33 requires a large capacity for storing the large number of tables. In order to reduce the capacity of the table indexer 33, basic tables having the basic address span ($e_W = 256$) and essential deviation correction characteristics are prepared in advance and are stored in the table indexer 33. The other tables having an address span of a different length from that of the basic tables can be prepared from the basic tables by extending or compressing the address span of the basic tables without changing the characteristics of the basic tables.

Another table having characteristics different from those of the basic tables can be made by correcting the basic table having the closest characteristics.

Figure 13:
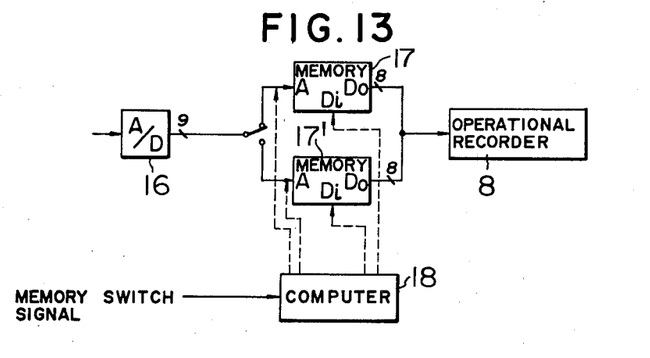
FIG. 13 is a block diagram of further pre-processor means according to the present invention.

Further, as shown in FIG. 13, when one more memory 17' having the same functions as the memory 17 is arranged in parallel with the memory 17 prior to the operational recorder 8, while the color scanner is operated by using the memory 17, the table stored in the other memory 17' is corrected in order to meet the following original picture, and the memories 17 and 17' are alternately used. In this embodiment, even if a plurality of original pictures mounted are aligned in the direction of the cylinder's axis, the original pictures can be processed continuously without stopping the color scanner, which is very convenient and practicable.

Figure 6:
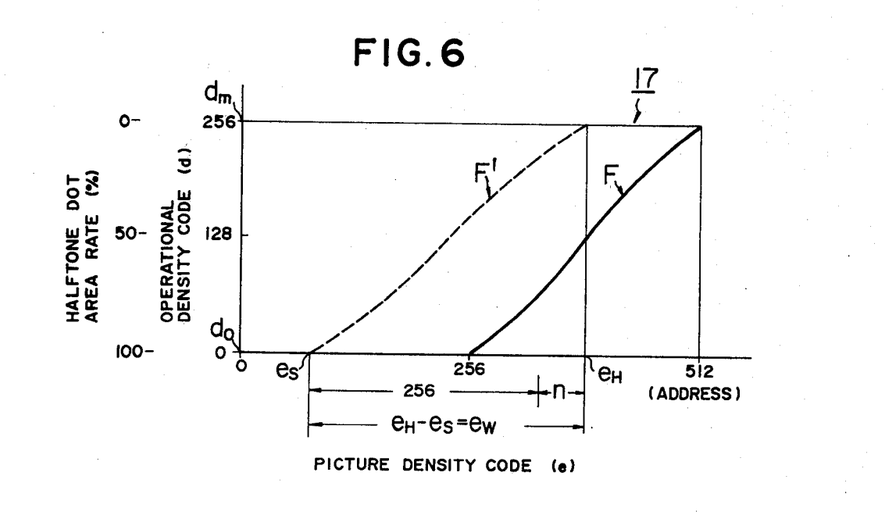
FIG. 6 shows a memory map of a table stored in the memory shown in FIG. 3.
Figures 7, 8:
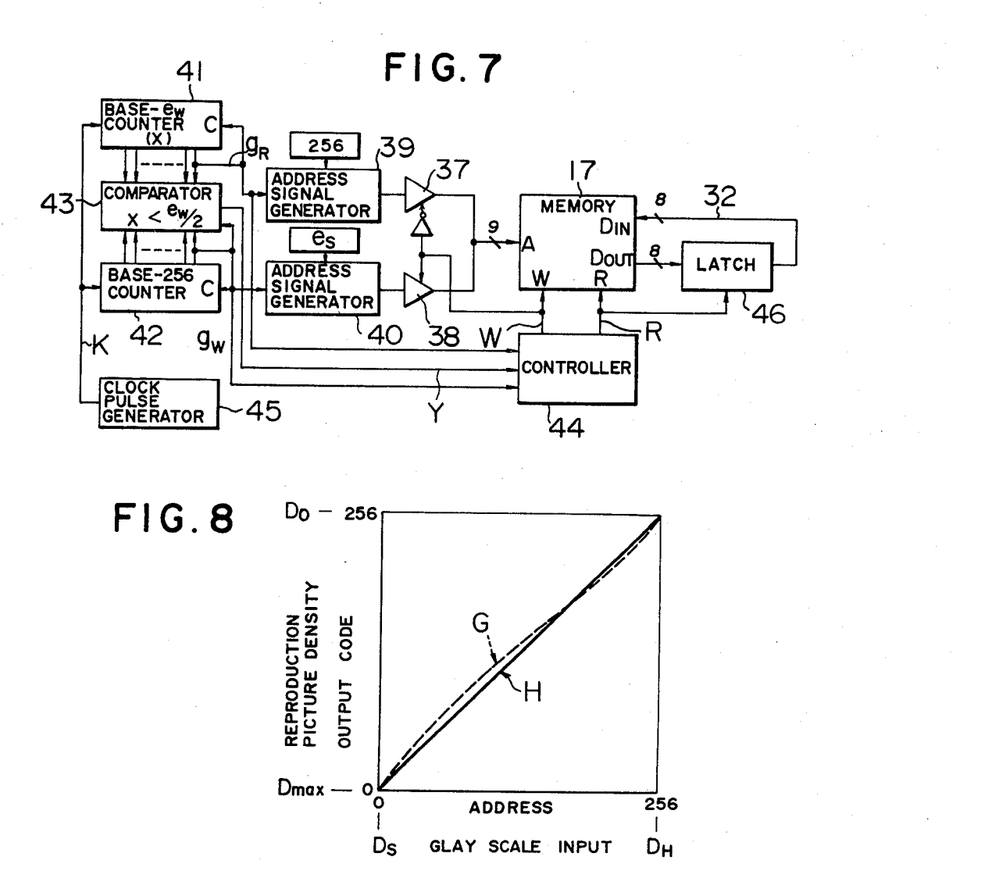
FIG. 7 is a block diagram of one embodiment of a means for rewriting a table in the memory shown in FIG. 3.
FIG. 8 shows a graph of a distortion correction table having a correction curve.
Figure 7:
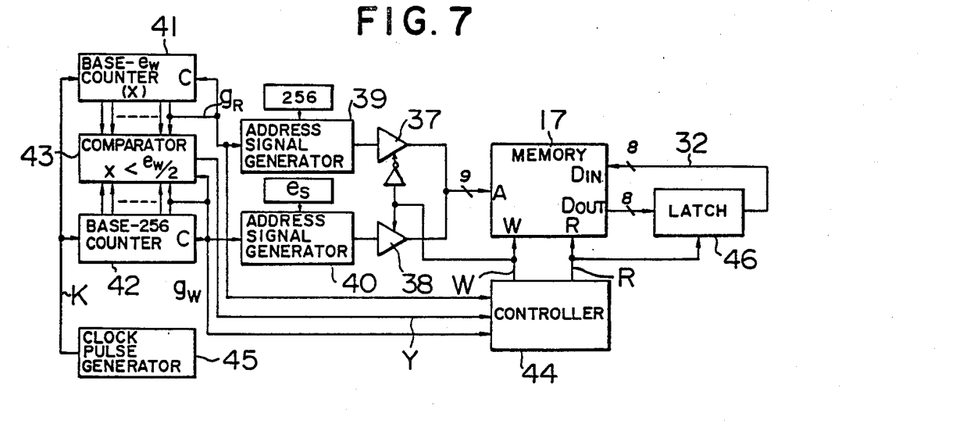
Figure 8:
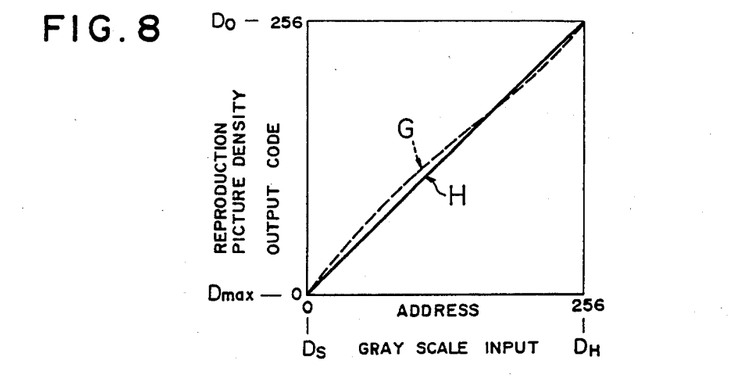

In FIGS. 6 and 7 is shown one embodiment for extending or compressing the address span $e_W$ of the basic table without changing the characteristics of the basic table.

The address span $e_W$ of the basic table is given by 256 addresses of eight bits, corresponding to 256 addresses of eight bits of the operational density code d.

The address span $e_W$ of the basic table is theoretically optional. However, when the code number and the address number are the same, the code number and the address number of a linear standard value table for obtaining the deviations, as hereinafter described, become the same, and there is no need to prepare a particular basic table, which is very convenient.

The conversion characteristics between the address number and the output code of the basic table are optional, and depend on the desired conversion characteristics, as mentioned above.

The entire address range of the memory 17 is 512 steps of nine bits and the address range of the output code is 256 steps of eight bits. That is, the memory 17 has a double capacity as large as the basic table. In FIG. 6 is shown the memory map of the memory 17 together with the address numbers and the output code numbers.

That is, one basic table is selected in the table indexer 33 by the index signal 34, and the address numbers and the corresponding data are sent to the computer 18 as the address signals 35 and the data signals 36. Then, the computer 18 transfers the selected basic table to the memory 17 by addressing the addresses from address 256 to address 512 in order to store the basic table once in the memory 17, thereby obtaining a characteristics curve F shown by a solid line in FIG. 6.

Then, the basic table written in the memory 17 is rewritten in other addresses in the memory 17. For example, the data of the basic table having the address span of 256 addresses are transferred in the addresses between the shadow and the highlight values $e_S$ and $e_H$ without changing the conversion characteristics, thereby obtaining a characteristics curve F' shown by a broken line in FIG. 6. That is, on this occasion, the address span is extended or compressed from the address span of 256 addresses to the address span $e_W = e_H - e_S$. In the embodiment shown in FIG. 6, the address span $e_W$ of the characteristics curve F' is extended to (256 + n) addresses from 256 addresses of the basic table.

In FIG. 7 there is shown one embodiment of such a table rewrite means which is in practice, included in the computer 18. The address terminal A of the memory 17 is connected to a reading address signal generator 39 and a writing address signal generator 40 through bus buffers 37 and 38, either the reading or the writing address signal generator being alternately switched on.

In the reading address signal generator 39, the address number is increased one by one by a reset pulse $g_R$ which is generated by a base-$e_W$ counter 41 every time that it counts the same numbers as that of the address span $e_W$ of the desired table. The base-$e_W$ counter 41 is reset by the reset pulse $g_R$.

In the writing address signal generator 40, the address number is increased one by one by a reset pulse $g_W$ which is generated by a base-256 counter 42 every 256 address counts of the basic table having the address span of 256 addresses. The base-256 counter 42 is reset by the reset pulse $g_W$.

In the base-$e_W$ counter 41 of an up-down counter type, the set count number $e_W$ can be programmed. When the set count number $e_W$ is smaller than 256, the counter 41 is initially set to zero as the up-counter, and when the set count number $e_W$ is more than 256, is initially set to the address $e_W$ as the down-counter.

The number X counted in the base-$e_W$ counter 41 is sent to a comparator 43 as a count number code. The comparator 43 detects the count number X of the base-$e_W$ counter 41 at a time when the reset pulse $g_W$ is output by the counter 42, and then compares the count number X with a comparative set value ($e_W/2$) to send a discrimination signal Y to a controller 44 for writing and reading the data into or from the memory 17. The two counters 41 and 42 are driven by a clock pulse K generated by a clock pulse generator 45.

The controller 44 for the writing and the reading determines the writing and the reading timings by the discrimination signal Y sent from the comparator 43 and the reset pulses $g_R$ and $g_W$ of the counters 41 and 42, and outputs a writing pulse W and a reading pulse R to the memory 17 at the writing and the reading timings, as hereinafter described.

The writing pulse W, when the writing instruction is given to the memory 17, opens the bus buffer 38 of the writing address signal generator 40 and closes the bus buffer 37 of the reading address signal generator 39.

The reading pulse R, when the reading instruction is given to the memory 17, forces a latch circuit 46 to latch the data read out of the memory 17.

The reading of the characteristics curve F of the basic table is carried out by addressing from address 256 to address 512 one by one every time that ($e_W=256+n$) number of clock pulses k are counted in the base-$e_W$ counter 41.

On this occasion, the reading pulse R is generated by the controller 44 every time that the reset pulse $g_R$ is fed to the controller 44, at the timing somewhat delayed as compared with the timing that the reset pulse $g_R$ is fed to the controller 44. The reading pulse R gives the reading instruction to the memory 17 so as to read the data out of the address addressed in the memory 17, and the data read out is latched in the latch circuit 46.

The writing of the desired characteristics curve F' of the desired table is started at the same time as the reading of the characteristics curve F. This is performed by addressing the addresses from the address $e_S$ to the address $e_H$ one by one every time that 256 number of clock pulses K are counted in the base-256 counter 42.

In this operation, the data latched in the latch circuit 46 is written in the address addressed by the writing pulse W in the memory 17.

The writing pulse W is generated successively after either reset pulse $g_R$ or $g_W$ and the reading pulse R depending on the output condition, i.e. the high level or the low level, of the discrimination signal Y. For example, when the address span of the desired table is extended, the writing pulse W is generated as follows. When the count number X of the base-$e_W$ counter 41 satisfys the formula of $$\left( X < \frac{e_W}{2} \right)$$

in the comparator 43 which outputs the discrimination signal Y of the high or the low level, the controller 44 generates the writing pulse W at the timing just after the reset pulse $g_R$ and the reading pulse R are generated. When the count number X of the base-$e_W$ counter 41 satisfys the formula of $$\left( X \geq \frac{e_W}{2} \right)$$

in the comparator 43 which outputs the discrimination signal Y of the low or the high level, the controller 44 generates the writing pulse W at the timing just after the reset pulse $g_W$ is generated.

As described above, when the reading of the characteristics curve F is carried out from address 256 to address 512, the writing of the characteristics curve F' is performed from the address $e_S$ to the address $e_H=e_S+e_W$. In this operation, in order to read out the basic table completely, $(256+n)\times 256$ clock pulses are required, as described above with reference to FIG. 7, and, on this occasion, the writing of the data is carried out in $256+n=e_W$ addresses, with result of $e_H=e_S+(256+n)$.

When the address span $e_W$ is larger than 256 addresses and n is positive, $e_W=256+n$ is initially set to the base-$e_W$ counter 41 and it is acted as the down-counter, as described above. In this case, the count number X in the comparator 43 is increased by n number every one writing address increase, for example, X equals n for the address $e_{S+1}$, X equals 2n for the address $e_{S+2}$. Since the count number X is counted by the base-$e_W$ counter 41, the count number X should be smaller than $e_W$.

The count number X is explained as follows. That is, the clock pulse number required addressing the entire addresses of the basic table is the same as that required transferring the table, and thus the first and the last addresses of the two tables are coincident along the time axis irrespective of the address span $e_W$ of the desired table.

In this case, assuming that the characteristics curve of the basic table is shown as a continuous graph, the address positions of the basic table correspond to the sampling positions of the graph, and the address positions of the desired table correspond to the sampling positions of a graph whose sampling pitch is changed.

However, when the characteristics curve of the basic table is illustrated as the graph, it is actually the discontinuous graph, and the data only exist in the addresses of the basic table. Hence, in order to transfer the characteristics curve of the basic table to the addresses of the desired table, the data of the addresses of the basic table are transferred to the closest addresses of the desired table. Consequently, the distance between one address of the desired table and the closest address thereto of the basic table along the time axis equals the count number X.

Then, when the address span of the desired table is compressed or reduced, the writing pulse W is generated in the similar manner to the extended case described above. In this embodiment, the base-$e_W$ counter 41 is initially set to zero, and it is operated as the up-counter. When the count number X satisfies the formula of $$\left( X > \frac{e_W}{2} \right)$$

in the comparator 43, the controller 44 generates the writing pulse W at the timing just after the reset pulse $g_W$ is generated, and when the count number x satisfies the formula of $$\left( X \leq \frac{e_W}{2} \right)$$

in the comparator 43, the controller 44 generates the writing pulse W at the timing just after the reset pulse $g_R$ and the reading pulse R is generated.

This operation can be applied not only to the adjustment of the density range for the input setup and the deviation correction control, as described above, but to the correction of the non-linear distortion involved in each color channel of the color scanner.

For example, when an original picture 1 of a gray scale is reproduced by a color scanner, a correction table for equalizing the reproduction characteristics between the gray scale of the original picture and the gray scale of the reproduction picture is stored in the memory. Such a correction table can be used as a non-linear distortion correction table for each color channel of the color scanner. One embodiment of such a correction table having the same addresses as the basic table is shown in FIG. 8.

In this case, the address span of the correction table prepared in the memory 17 is not restricted to 256 addresses, and the correction tables having address numbers except 256 are made to those having 256 addresses by using the address span extending or the compressing method described above. This non-linear distortion correction table need not to be changed every original picture, and thus is utilized in common every original picture.

Figure 9:
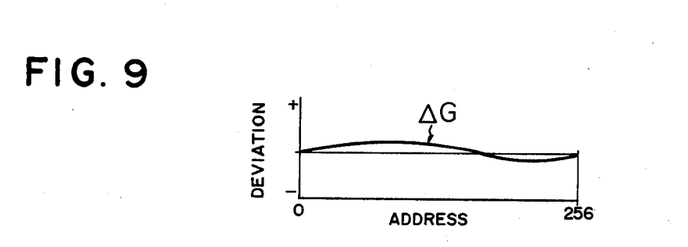
FIG. 9 shows a graph of a deviation value table obtained from the distortion correction table of FIG. 8.

The characteristics of the correction table may be recorded therein in the form of a characteristics curve G shown in FIG. 8. However, as mentioned above, in order to use it in combination with the basic tables for obtaining the basic conversion characteristics required to each original picture, its deviation values $\pm G = G - H$ with respect to a standard linear characteristics line H are calculated every addresses, and then a deviation table is prepared from the deviation values calculated, as shown in FIG. 9.

This deviation table for the non-linear distortion correction requires only a small capacity for being stored, and is used in common for every original picture. The deviation table is preferably stored in a rewritable memory so that it may be corrected, as occasion demands.

Figure 10:
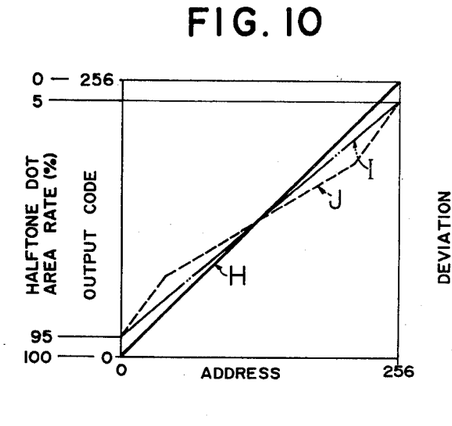
FIG. 10 shows a graph of a basic table having desired characteristics curves.
Figure 11:
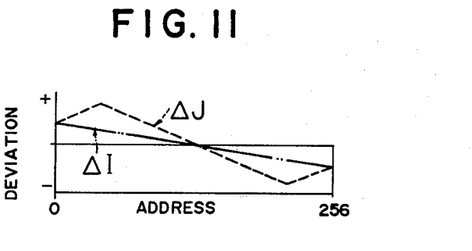
FIG. 11 shows a graph of a deviation value table obtained from the basic table of FIG. 10.

Further, the basic tables having the characteristics curves for each original picture can conveniently be recorded in the form of the deviation tables, as shown in FIGS. 10 and 11.

The basic tables having characteristics lines I and J shown in FIG. 10 are converted into the deviation tables shown in FIG. 11 by calculating the deviation values of every address with respect to the linear standard characteristics line H.

In order to reproduce the correction table of the curve G and the basic tables of the lines I and J shown in FIGS. 8 and 10, their standard characteristics values and their deviation values are added in every address.

Thus the obtained tables are rewritten in the memory 17 according to the original pictures by using the address span extending or compressing method described above.

It is readily understood from the above description that the non-linear distortion involved in the color scanner can be corrected independent of the conversion characteristics curves required to each original picture, and hence the conversion characteristics curves can be obtained as ideal conversion characteristics curves excluding the distortion correction.

Therefore, the basic tables may not be stored in the table indexer 33, and, when they are obtained by calculating in the computer 18, the calculation formulae can be simplified, and further small corrections of the basic tables so as to make the desired tables can readily be done by the computer 18.

Meanwhile, the table prepared in the memory 17 may be displayed in the form of a graph on a display means such as a color cathod ray tube (CRT), or the like. From the graph displayed on the display means, it can be readily checked whether the table includes the desired correction characteristics, and while the graph is observed, the desired correction can be made to the table by means of an input means such as a key board via the computer 18.

Figure 12:
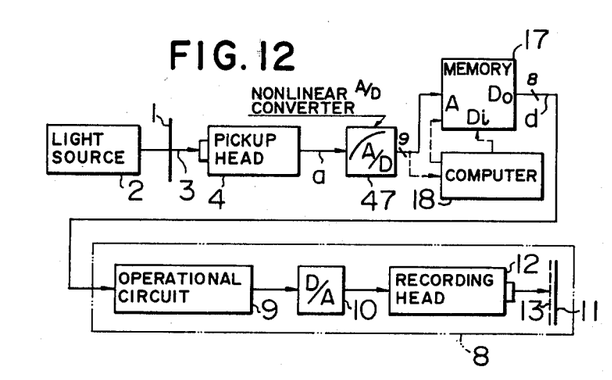
FIG. 12 is a block diagram of a digital color scanner including another pre-processor means according to the present invention.

In FIG. 12 there is shown a digital color scanner including further embodiment of a pre-processor means according to the present invention. This embodiment has the same construction as that of FIG. 3 except that instead of the log-converter 5 and the A/D converter 16 shown in FIG. 3 a non-linear A/D converter 47 is used. This non-linear A/D converter 47 does not always require an exact logarithmic characteristics. That is, the non-linear A/D converter 47 compresses the dynamic range of the picture density signal b input so that the address span $e_W$ of the picture density code e output may be included in the address range of the memory 17 according to the dynamic range.

In this case, the non-linear distortion caused by the mismatch compared with the logarithmic conversion characteristics may be removed by a non-linear correction table which is similar to the one described above in the same manner as above. This is the same as the analog log-converter.

Although the present invention has been described with reference to preferred embodiment thereof, however, various changes and modifications can be made by those skilled in the art without departing from the scope of the present invention.

What is claimed is:

1. A method for pre-processing a picture signal prior to an operational circuit of a picture reproducing machine wherein an original picture is scanned photoelectrically to obtain the picture signal, comprising the steps of:
    (a) reading out first conversion characteristic data stored in a memory which disposed at the prior stage of a preprocessor means so that a desired reproductible density range of an original picture may be converted to a density range which can be processed by operation of said picture reproducing machine by addressing addresses of the memory by the picture signal; and
    (b) changing the first conversion characteristic data by second conversion characteristic data depending on a desired reproducible density range of the original picture.

2. A method as defined in claim 1, wherein the first conversion characteristics data is stored in a first memory or a second memory which are alternately used.

3. A method as defined in claim 1, wherein the address span of the first conversion characteristics data curve is changed.

4. A method as defined in claim 1, wherein the conversion characteristics curve of the first conversion characteristics data is changed.

5. A method as defined in claim 3 or 4, wherein a deviation correction value is contained in the conversion characteristics data.

6. A method as defined in claim 3 or 4, wherein a non-linear distortion correction value is contained in the conversion characteristics data.

* * * * *